United States Patent
Li (10) Patent No.: US 11,646,650 B2
(45) Date of Patent: May 9, 2023

(54) SWING MOTOR WITH TWO MOVABLE MEMBERS HAVING ELASTIC SUPPORT MEMBERS AND TORSION ELASTIC MEMBERS

(71) Applicant: GUANGZHOU CHILI TECHNOLOGY CO., LTD., Guangdong (CN)

(72) Inventor: Mi Li, Guangzhou (CN)

(73) Assignee: GUANGZHOU CHILI TECHNOLOGY CO., LTD., Guangdong (CN)

( * ) Notice: Subject to any disclaimer, the term of this patent is extended or adjusted under 35 U.S.C. 154(b) by 379 days.

(21) Appl. No.: 16/957,678

(22) PCT Filed: Dec. 10, 2018

(86) PCT No.: PCT/CN2018/120130
§ 371 (c)(1),
(2) Date: Jun. 24, 2020

(87) PCT Pub. No.: WO2019/128689
PCT Pub. Date: Jul. 4, 2019

(65) Prior Publication Data
US 2020/0360123 A1    Nov. 19, 2020

(30) Foreign Application Priority Data

Dec. 27, 2017    (CN) .......................... 201711498421.1

(51) Int. Cl.
  *H02K 33/02*    (2006.01)
  *A61C 17/34*    (2006.01)
  (Continued)

(52) U.S. Cl.
  CPC .......... *H02K 33/02* (2013.01); *A61C 17/3409* (2013.01); *B26B 19/282* (2013.01); *H02K 7/145* (2013.01)

(58) Field of Classification Search
  CPC ........................ B26B 19/282; A61C 17/3409
  (Continued)

(56) References Cited

U.S. PATENT DOCUMENTS 2,331,501 A * 10/1943 Rand, Jr. ................. B26B 19/26
  30/43.91
2,773,306 A * 12/1956 Ranson ................... B26B 19/28
  310/154.25

(Continued)

FOREIGN PATENT DOCUMENTS

CN    1125919    7/1996
CN    1163586    10/1997
(Continued)

OTHER PUBLICATIONS

International Search Report issued for International Patent Application No. PCT/CN2018/120130, dated Feb. 28, 2019, 5 pages including English translation.

(Continued)

*Primary Examiner* — Maged M Almawri
(74) *Attorney, Agent, or Firm* — Hamre, Schumann, Mueller & Larson P.C.

(57) ABSTRACT

Disclosed by the present invention are a swing motor and an electronic device, the swing motor comprising a seat; at least two movable members, comprising a first movable member and a second movable member arranged to be spaced apart, wherein the first movable member and the second movable member bear opposite electromagnetic thrusts; elastic support members that correspond one-to-one to the movable members, comprising a first elastic support member and a
(Continued)

second elastic support member, wherein the first movable member is mounted onto the seat by means of the first elastic support member, and the second movable member is mounted onto the seat by means of the second elastic support member; further comprised is a twisting elastic member, one end of the twisting elastic member being connected to the first movable member or the second movable member, and the other end being connected to an executing member.

13 Claims, 4 Drawing Sheets

(51) Int. Cl.
*B26B 19/28* (2006.01)
*H02K 7/14* (2006.01)
(58) Field of Classification Search
USPC .......................................... 310/20–25, 15, 12
See application file for complete search history.

(56) References Cited

U.S. PATENT DOCUMENTS

| | | | | |
|---|---|---|---|---|
| 4,428,117 | A * | 1/1984 | Horii | B26B 19/386 |
| | | | | 30/43.7 |
| 5,632,087 | A * | 5/1997 | Motohashi | H02P 25/032 |
| | | | | 30/43.92 |
| 5,921,134 | A * | 7/1999 | Shiba | B26B 19/282 |
| | | | | 310/20 |
| 6,226,871 | B1 * | 5/2001 | Eichhorn | B26B 19/288 |
| | | | | 30/346.51 |
| 6,991,217 | B2 * | 1/2006 | Shimizu | B26B 19/288 |
| | | | | 310/12.01 |
| 7,053,507 | B2 | 5/2006 | Kobayashi et al. | |
| 7,504,751 | B2 * | 3/2009 | Kraus | B26B 19/288 |
| | | | | 310/12.24 |
| 7,607,229 | B2 * | 10/2009 | Motohashi | B26B 19/288 |
| | | | | 30/44 |
| 7,965,000 | B2 * | 6/2011 | Komori | H02K 33/16 |
| | | | | 310/15 |
| 8,720,069 | B2 * | 5/2014 | Iwashita | B26B 19/048 |
| | | | | 30/346.51 |
| 9,669,561 | B2 * | 6/2017 | Fitzpatrick | B26D 7/2635 |
| 2003/0094861 | A1 * | 5/2003 | Shimizu | H02K 33/10 |
| | | | | 310/36 |
| 2005/0140219 | A1 * | 6/2005 | Sanematsu | H02K 33/16 |
| | | | | 310/15 |
| 2008/0307654 | A1 * | 12/2008 | Motohashi | B26B 19/288 |
| | | | | 30/45 |
| 2016/0000543 | A1 * | 1/2016 | Kobayashi | A61C 17/3481 |
| | | | | 15/22.1 |

FOREIGN PATENT DOCUMENTS

| | | |
|---|---|---|
| CN | 1638248 | 7/2005 |
| CN | 1647350 | 7/2005 |
| CN | 1988990 | 6/2007 |
| CN | 102545526 | 7/2012 |
| CN | 103959619 | 7/2014 |
| CN | 108258874 | 7/2018 |
| CN | 207801716 | 8/2018 |
| EP | 1539438 | 3/2006 |
| EP | 1785240 | 5/2007 |
| EP | 2790309 | 10/2014 |
| JP | 2005185067 | 7/2005 |
| WO | 2004028759 | 4/2004 |

OTHER PUBLICATIONS

First Office Action and Search Report issued for Chinese Patent Application No. 201711498421.1, dated Feb. 28, 2019, 21 pages including English translation.
Second Office Action issued for Chinese Patent Application No. 201711498421.1, dated Jul. 25, 2019, 8 pages including English translation.
Extended European Search Report issued for European Patent Application No. 18896775.6, dated Jan. 11, 2021, 9 pages.
Office Action issued for Japanese Patent Application No. 2020-555276, dated Sep. 21, 2021, 8 pages including English translation.

* cited by examiner

SWING MOTOR WITH TWO MOVABLE MEMBERS HAVING ELASTIC SUPPORT MEMBERS AND TORSION ELASTIC MEMBERS

TECHNICAL FIELD

The present disclosure relates to the technical field of actuators, in particular relates to a swing motor and an electric device.

BACKGROUND

Currently, the use of household appliances such as electric toothbrushes and electric razors greatly facilitates people's lives. At the same time, the performance of the motor determines the using experience of the product.

Conventional electric devices (such as electric toothbrushes, electric razors, etc.) are generally driven by rotating motors, most of which include conversion devices such as a crank, which has a complex structure, a low transmission efficiency, and a large vibration noise. There are some technologies that use linear motors to replace rotating electrical machines. One of the technologies related to linear motors is that two movable members are connected by a coupling spring and supported by mounting springs, respectively, and move in opposite phases on a basic linear path, so as to cancel a part of the reverse force transmitted to the housing. The mounting spring thereof provides spring restoring force on the linear path, while providing a rigid support in at least one direction perpendicular to the path direction at the same time. In this technique, the two movable members only move on a substantially linear path, which limits the external power output mode of the motor, resulting in the electric device's failure to achieve better effects.

Another technique is a linear executing member with a plurality of movable members arranged in parallel, using the movement of the movable members in opposite phases to cancel the transmission of a part of the vibration; the output shaft thereof is provided at an end of a movable member, a weight is mounted on another movable member, such that the positions of the gravity centers of the movable members are consistent with each other, and the vibration can be reduced. The weight greatly increases the volume and weight of the motor. In addition, the heavier movable members with weights generate a large vibration force during reciprocating motion, which is not conducive to vibration reduction and noise reduction, and the product is less comfortable.

SUMMARY

Accordingly, in order to overcome the shortcomings of the prior art, the present disclosure provides a swing motor and an electric device. The swing motor can not only drive the executing member to move linearly and reciprocally, but also can drive the executing member to swing reciprocally, which can use the torsion elastic member to reduce the transmission of the rotating torque to the machine base without adding a falling block, such that the motor is miniaturized. The vibration and weight of the electric device can also be reduced.

The technical solutions are as follows:

A swing motor is provided, which includes a machine base, at least two movable members, elastic support members in one-to-one correspondence with the movable members and a torsion elastic member. The movable members are movable parts of an electromagnetic device, at least two movable members include a first movable member and a second movable member that are spaced apart, the first movable member and the second movable member are subjected to opposite electromagnetic thrusts, and the first movable member and the second movable member reciprocate in opposite phases. The elastic support members include a first elastic support member and a second elastic support member, the first movable member is mounted on the machine base by the first elastic support member, the second movable member is mounted on the machine base by the second elastic support member, the first movable member is subjected to a first rotating torque generated by combining an elastic force of the first elastic support member and the electromagnetic thrust, the second movable member is subjected to a second rotating torque generated by combining an elastic force of the second elastic support member and the electromagnetic thrust. One end of the torsion elastic member is connected to the first movable member or the second movable member, and the other end thereof is connected to an executing member.

In the swing motor of the present disclosure, the first movable member and the second movable member thereof are electromagnetically coupled to each other, such that the two are subjected to opposite electromagnetic thrusts (attractive force and repulsive force). When the current supplied to the electromagnetic device is periodically reversed, the first movable member and the second movable member can move linearly and reciprocally in opposite phases. At the same time, since the first movable member is subjected to the first rotating torque and the second movable member is subjected to the second rotating torque, both of the first movable member and the second movable member can swing with respect to the machine base. Accordingly, both of the first movable member and the second movable member simultaneously obtain a compound motion of linear reciprocating movement and reciprocating swinging around a centroid. When the torsion elastic member is connected to one of the movable members, the executing member (such as a brush head or a cutter head) provided on the torsion elastic member has motion output of linear reciprocating and swinging reciprocating, which can achieve an effective cleaning effect.

At the same time, due to the deforming characteristics of the elastic support member, the movable member obtains a mechanical stability required for mounting, and has an axial moving freedom and a rotational freedom, that is, the movable member can move steadily and reliably without using sliding bearings or rolling bearings, thus avoiding mechanical friction and noise. The elastic support member provides the elastic restoring force required for the linear movement and rotation of the movable member, the coupling spring is no longer needed, and the number of components of the swing motor is reduced, so as to simplify the structure.

More importantly, the first movable member and the second movable member are in opposite phase motion with each other. In a linear moving direction, a part or even all of the binding force of the two movable members can be canceled, which can reduce the vibration transmitted to the machine base. Meanwhile, the executing member provides a balancing torque to the movable member by the elastic force provided by the torsion elastic member, which can cancel the inertial torque generated by the inconsistent of the gravity centers of the two movable members. There is no need to add weight to reduce the rotating torque transmitted to the machine base, the vibration can be reduced, and the motor can be miniaturized. Alternatively, a weight with smaller volume may also be equipped to reduce the weight of the entire motor. The aforementioned technical solutions are further described below:

In one of the embodiments, a rotational deforming direction of the torsion elastic member and a rotational deforming direction of the elastic support member corresponding to the movable member connected to the torsion elastic member are the same or opposite; a linear moving direction of the torsion elastic member is the same as a linear deforming direction of the elastic support member corresponding to the movable member connected to the torsion elastic member. That is, when the torsion elastic member is connected to the first movable member, the rotational deforming direction of the torsion elastic member and the rotational deforming direction of the first elastic support member are the same or opposite, and the linear moving direction of the torsion elastic member and a linear deforming direction of the first elastic support member are the same; when the torsion elastic member is connected to the second movable member, the rotating direction of the torsion elastic member and the rotating direction of the second elastic support member are the same or opposite, and the linear moving direction of the torsion elastic member and a linear deforming direction of the second elastic support member are the same. The above design enables the torsion elastic member and the corresponding elastic support member to have the same plane of motion, such that the effect of effectively canceling the vibration can be achieved.

In one of the embodiments, a current frequency of the electromagnetic device $\omega$, a rotational rigidity coefficient of the torsion elastic member $k_2$ and a rotational inertia of the executing member $J_2$ satisfy the following relationship:

when the executing member needs to obtain an amplified swing output or when a swing amplitude required to be constant, and a vibration force transmitted to the machine base is required to be reduced, $$0 < \omega < \sqrt{\frac{k_2}{J_2}};$$

when a rotation amplitude of the movable member connected to the executing member is required to be controlled to be zero, $$\omega = \sqrt{\frac{k_2}{J_2}};$$

when rotations of the executing member and the movable member connected to the executing member are required to be controlled as opposite phase, $$\omega > \sqrt{\frac{k_2}{J_2}};$$

Therefore, under the circumstance that the motor is unchanged, different product functions can be obtained by connecting executing members with different inertia moments, and using a current frequency control method. In order for the swing motor to obtain a sufficient frequency of reciprocating motion, without making the drive circuit and mechanical structure parts too large, a drive current frequency of the motor and a natural frequency $$\frac{1}{2\pi}\sqrt{\frac{k_2}{J_2}}$$

of the executing member are controlled between 50 HZ and 500 HZ.

In one of the embodiments, a rotational rigidity coefficient of the torsion elastic member is less than a rotational rigidity coefficient of the elastic support member corresponding to the movable member connected to torsion elastic member. That is, when the torsion elastic member is connected to the first movable member, a rotational rigidity coefficient of the torsion elastic member is less than a rotational rigidity coefficient of the first elastic support member; when the torsion elastic member is connected to the second movable member, a rotational rigidity coefficient of the torsion elastic member is less than a rotational rigidity coefficient of the second elastic support member. In this way, the rotation angle of the movable member with respect to the torsion elastic member and the executing member is smaller, that is, when the amplitude required by the executing member is constant, the amplitude of the movable member is relatively small, and the vibration transmitted to the machine base is also reduced.

In one of the embodiments, the first elastic support members include at least two first elastic pieces. The at least two first elastic pieces are respectively disposed on both sides of the first movable member. One ends of the first elastic pieces are fixed on the machine base and the other ends thereof are connected to the first movable member. The second elastic support members include at least two second elastic pieces. The at least two second elastic pieces are respectively disposed on both sides of the second movable member. One ends of the second elastic pieces are fixed on the machine base, and the other ends thereof are connected to the second movable members. Bottom ends of the first elastic pieces and the second elastic pieces on the same side are integrally connected as a whole piece structure fixed on the machine base. The first elastic support member and the second elastic support member elastically support the first movable member and the second movable member on both sides, respectively, such that the subjected forces of the first movable member and the second movable member are balanced, so as to further achieve a damping effect. At the same time, the bottom ends of the first elastic piece and the second elastic piece are integrally connected as a whole piece structure, and then fixed on the machine base, which can simplify the structure of the elastic support member, so as to facilitate manufacturing and mounting, and reduce the cost. In addition, the acting forces subjected to the first elastic support member and the second elastic support member are in opposite directions, such that the internal canceling effect is performed first in the whole structure, and a vibration force transmitted to the machine base will be further reduced.

In one of the embodiments, all of acting points of the first elastic pieces on the first movable member and all of acting points of the second elastic pieces on the second movable member are located in the same plane, such that the elastic acting force is distributed in the same plane, which can cancel the transmission of a part of the vibration force to the housing.

In one of the embodiments, the first movable member includes a permanent magnet, the second movable member includes an electromagnet; or the swing motor further includes a fixing member, the fixing member includes an electromagnet, and both of the first movable member and the second movable member include permanent magnets; or further includes a fixing member, the fixing member includes a permanent magnet, both of the first movable member and the second movable member include an electromagnet.

In one of the embodiments, the first movable member includes a permanent magnet, the second movable member includes two of the electromagnets, current magnitudes and directions of the two electromagnets are the same, and the two electromagnets are symmetrically arranged on both sides of the permanent magnet; or the first movable member includes an electromagnet, the second movable member includes two sets of the permanent magnets, magnetic field directions of the two sets of the permanent magnets are the same, and the two sets of the permanent magnets are symmetrically arranged on both sides of the electromagnet. This arrangement enables the electromagnetic thrust to be located on a structural symmetry plane of the swing motor, which can reduce the impact of the vibration force and torque in other additional directions to the motor. In addition, the attractive force of the middle permanent magnet to the cores of the electromagnets on both sides or the attractive force of the middle electromagnet to the permanent magnets on both sides can be largely canceled, thus reducing the load on the first support elastic member and the second support elastic member, which is beneficial for structural stability.

In one of the embodiments, the first movable member further includes a fixing frame, the two permanent magnets are fixed in the fixing frame in parallel, the second movable member further includes an upper pressing plate and a lower pressing plate, the two electromagnets are arranged side-by-side between the upper pressing plate and the lower pressing plate, the upper pressing plate is provided with a sliding groove and an opening in communication with the sliding groove. The first movable member extends through the opening and enters a position between the two electromagnets and is relatively movably mounted in the sliding groove. The aforementioned design allows the two parallel permanent magnets to be held in the middle of two parallel electromagnets spaced apart, and both of the first movable member and the second movable member can relatively move om swing. The structure design of the present disclosure is reasonable, the structure thereof is simple, the number of components is small, and the production cost is low.

The present disclosure also provides an electric device including an executing member and the aforementioned swing motor, the executing member is connected to the torsion elastic member. Due to the use of the aforementioned swing motor, vibration and weight of the electric device can be reduced. The executing member can obtain different swing outputs by adjusting the current frequency, which is more applicable.

DESCRIPTION OF REFERENCE SIGNS

10—swing motor, 11—machine base, 12—first immovable member, 121—fixing frame, 122—permanent magnet, 13—second movable member, 131—upper pressing plate, 1311—opening, 1312—sliding groove, 132—lower pressing plate, 133—electromagnet, 1331—core, 1332—winding, 14—first elastic support member, 141—first elastic piece, 15—second elastic support member, 151—second elastic piece, 16—torsion elastic member, 20—executing member, 30—housing.

DETAILED DESCRIPTION

In order to make the objectives, technical solutions and advantages of the present disclosure more clear, the present disclosure will be further described in detail below in conjunction with the drawings and specific embodiments. It should be understood that the specific embodiments described herein are only used to explain the present disclosure, and do not limit the protection scope of the present disclosure.

It should be understood that when an element is defined as "fixed to" another element, it is either directly on an element or indirectly on an element by a mediating element. When an element is defined as "connect" to another element, it can be directly connected to an element or it can be connected to an element by a mediating element. In addition, unless otherwise specified, the descriptions of the terms "first" and "second" in the description are only used to distinguish the various components, elements, steps, etc. in the description, and are not used to indicate the logical relationship or order relationship between the various components, elements, steps, etc.

As shown in FIGS. 1 to 4, the electric device according to the embodiment of the present disclosure includes an executing member 20, a housing 30, and a swing motor 10 provided in the housing 30. The executing member 20 is connected to a torsion elastic member 16 of the swing motor 10. The executing member 20 is a toothbrush head (shown in FIGS. 1 to 3) or a cutter head (shown FIG. 4). When the executing member 20 is a toothbrush head, the electric device is an electric toothbrush, when the executing member 20 is a cutter head, the electric device is an electric shaver. It should be noted that the executing member 20 of the electric device can also be replaced by other executing structures according to actual needs.

Figure 1:
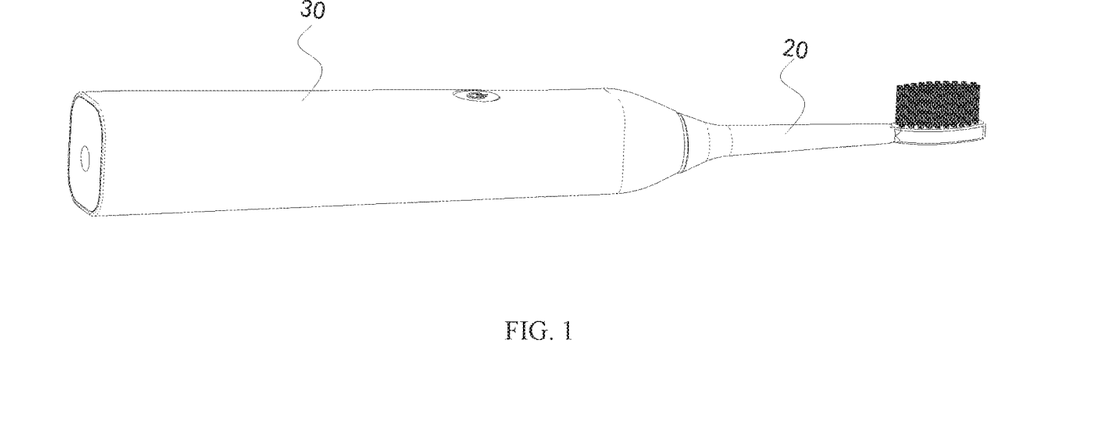
FIG. 1 is a schematic view of an electric device according to an embodiment of the present disclosure.
Figure 2:
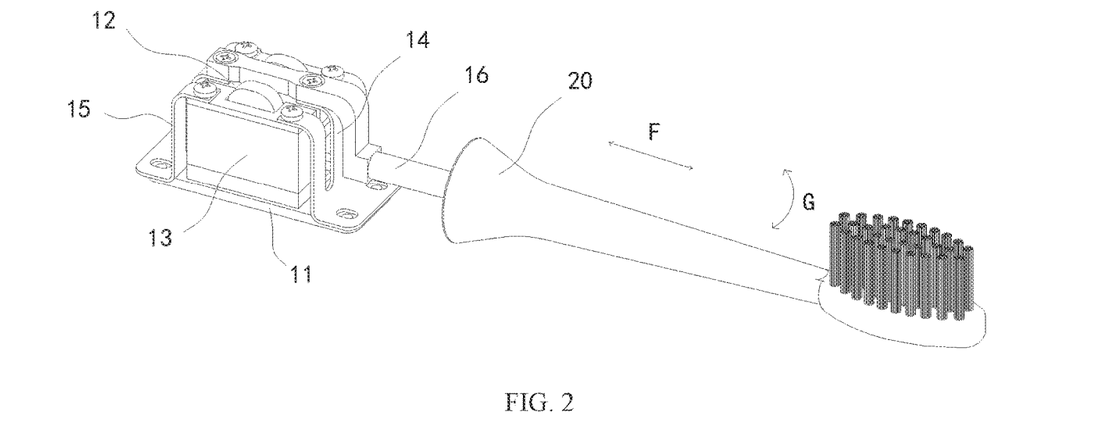
FIG. 2 is a schematic assembly view of the swing motor and the executing member shown in FIG. 1.
Figure 4:
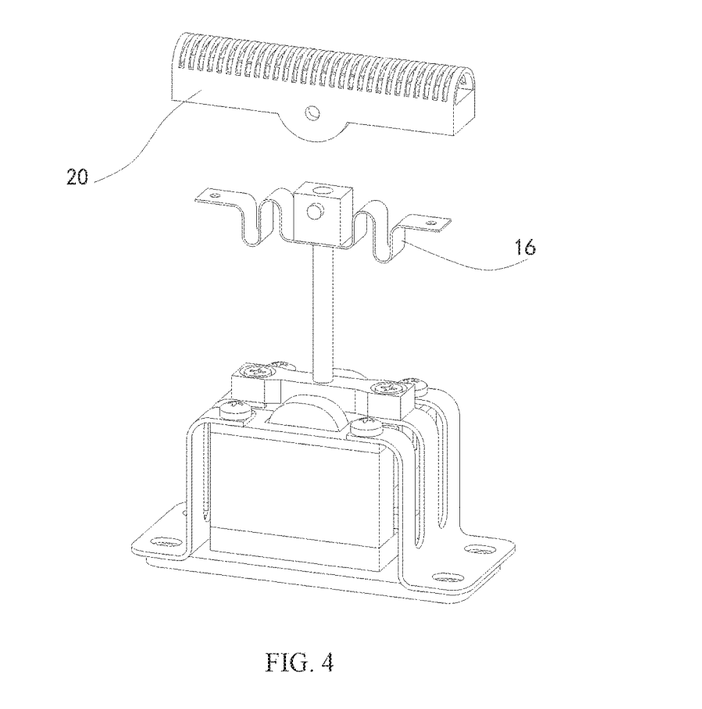
FIG. 4 is a schematic assembly view of the swing motor and the executing member according to another embodiment of the present disclosure.

FIGS. 2 and 4 are two application embodiments of the swing motor 10 respectively according to the embodiment of the present disclosure. Since the structures of the swing motors 10 in the two application embodiments are the same, only the structure of the swing motor 10 in FIG. 2 is annotated in detail. Referring to FIG. 2, the swing motor 10 includes a machine base 11, at least two movable members, elastic support members in one-to-one correspondence with the movable members, and a torsion elastic member 16. The machine base 11 is a mounting base plate, which is used to fix the swing motor 10 in the housing 30 of the electric device. The movable members are movable parts of an electromagnetic device. The at least two movable members includes a first movable member 12 and a second movable member 13 that are spaced apart. The first movable member 12 and the second movable member 13 are subjected to opposite electromagnetic thrusts, therefore the first movable member 12 and the second movable member 13 reciprocate in opposite phases to each other. The elastic support member includes a first elastic support member 14 and a second elastic support member 15. The first movable member 12 is mounted on the machine base 11 via the first elastic support member 14. The second movable member 13 is mounted on the machine base 11 via the second elastic support member 15. The first movable member 12 is subjected to a first rotating torque generated by combining an elastic force of the first elastic support member 14 and the electromagnetic thrust. The second movable member 13 is subjected to a second rotating torque generated by combining an elastic force of the second elastic support member 15 and the electromagnetic thrust. The torsion elastic member 16 is a Z-shaped elastic torsion bar or a torsion spring, one end of which is fixedly connected to the first movable member 12, and the other end thereof is interference-connected with the hole in the executing member 20.

The working principle and effect of the swing motor 10 according to the embodiment of the present disclosure are described below. The first movable member 12 and the second movable member 13 are electromagnetically coupled to each other, such that the two are subjected to opposite electromagnetic thrusts. When the current supplied to the electromagnetic device is periodically reversed, the first movable member 12 and the second movable member 13 can move linearly and reciprocally in opposite phases (the bidirectional arrow F in FIG. 2 is the path direction of linear reciprocating movement). At the same time, since the first movable member 12 is subjected to the first rotational torque, the first movable member can swing reciprocally with respect to the machine base 11 (the bidirectional arrow G in FIG. 2 is the path direction of the reciprocating swing). Similarly, the second movable member can also swing in opposite phases with respect to the machine base 11. Thus, both of the first movable member 12 and the second movable member 13 simultaneously obtain a compound motion of linear reciprocating movement and reciprocating swinging around a centroid in the same axial direction. When the torsion elastic member 16 is connected to the first movable member 12, the executing member 20 provided on the torsion elastic member 16 has motion output of linear reciprocating and swinging reciprocating, which can achieve an effective cleaning effect.

At the same time, due to the deformation characteristics of the elastic support member, the movable member obtains a mechanical stability required for mounting, and has an axial moving freedom and a rotational freedom, that is, the movable member can move steadily and reliably without the use of sliding bearings or rolling bearings, while avoiding mechanical friction and noise. The elastic support member provides all the elastic restoring force required for the linear movement and rotation of the movable member, the coupling spring is no longer needed, and the number of components of the swing motor is reduced, so as to simplify the structure. In other embodiments, the elastic support member can also provide more than 80% of the elastic restoring force required for the linear movement and rotation of the movable member, which greatly reduces the spring force of the coupling spring between the first movable member 12 and the second movable member 13, and the coupling spring can be miniaturized and light-weighted.

In addition, more importantly, the first movable member 12, the second movable member 13, and the executing member 20 are in opposite phase motion with each other. In a linear moving direction, that is, in the F direction, the elastic force transmitted by the two movable members to the machine base can cancel with each other, and the vibration on the machine base 11 can be reduced. At the same time, by the elastic force provided by twisting the elastic member 16, the executing member 20 provides a balancing torque to the first movable member 12, which can cancel the inertial torque caused by the inconsistent of the gravity centers of the two movable members. There is no need to add weight to reduce the rotating torque transmitted to the machine base 11, the vibration can be reduced, and the motor 10 can be miniaturized. Alternatively, a weight with smaller volume may also be equipped to reduce the weight of the entire motor 10. It should be noted that, in other embodiments, the executing member 20 may also be connected to the second movable member 13 by the torsion elastic member 16. Moreover, the number of executing members 20 is not unique, and each movable member can be connected to one executing member 20 by one torsion elastic member 16.

It should be noted that, a rotational deforming direction of the torsion elastic member 16 and a rotational deforming direction of the first elastic support member 14 corresponding to the first movable member 14 connected to the torsion elastic member 16 are the same or opposite. A linear moving direction of the torsion elastic member 16 is the same as a linear deforming direction of the first elastic support member 14 corresponding to the first movable member 14 connected to the torsion elastic member 16, that is, the torsion elastic member 16 and the elastic support member have the same plane of motion, such that the effect of canceling vibration can be effectively achieved.

In the embodiment of the present disclosure, in order to reduce or completely eliminate the linear reciprocating vibration force transmitted from the first movable member 12 and the second movable member 13 to the machine base, the following configuration is selected:

$$\frac{k_{f1}}{m_{t1}} = \frac{k_{f2}}{m_{t2}}$$

where $k_{f1}$ is the elastic coefficient of the first elastic support 14 on a straight path, $m_{t1}$ is the mass of the first movable member 12 and the executing member 20 (the torsion elastic member 16 is a lightweight spring, and the actual mass thereof is included in the first movable member 12 and the executing member 20), $k_{f2}$ is the elastic coefficient of the second elastic support 15 on the straight path, and $m_{t2}$ is the mass of the second movable member 13.

Figure 7:
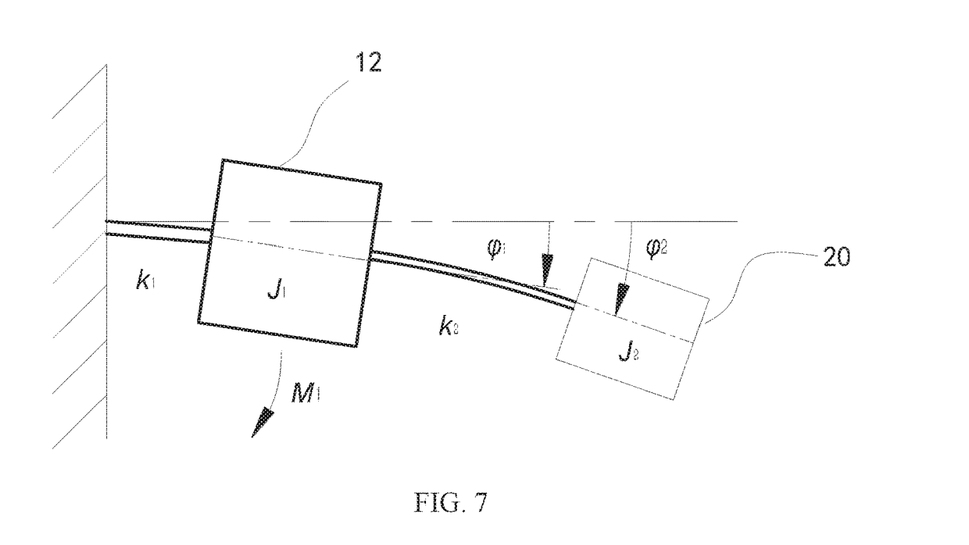
FIG. 7 is a schematic view of a vibration system corresponding to the structure shown in FIGS. 1 to 4.

The vibration system formed by connecting the torsion elastic member 16 with the first movable member 12 and the executing member 20 is analyzed below. The effects of damping and errors (in actual products, the connection end of the torsion elastic member 16 will also be mounted with a smaller damped rubber seals) is ignored. When only considering the rotating motion, the principle can be explained by the simplified model as follows. FIG. 7 shows the forced vibration of an undamped system with two freedom degree. The first movable member 12 has an inertia moment of $J_1$, and the first elastic support member 14 with a rotational rigidity coefficient of $k_1$ is connected to the machine base 11, the inertia moment of the executing member 20 is $J_2$. The torsion elastic member 16 with a rotational rigidity coefficient $k_2$ is connected to the first movable member 12. In the model simplification, the inertia moment of the torsion elastic member 16 has been included in the correspondingly connected first movable member 12 and executing member 20, an excitation torque $M_1 = M \sin \omega t$ acts on the first movable member 12, where M is the amplitude of the torque acting on the first movable member 12, and $\omega$ is a current frequency of the electromagnet 133. Using $\varphi_1$ and $\varphi_2$ to represent the angular displacement of the first movable member 12 and the executing member 20 with respect to the equilibrium position, the differential equation of motion of the system can be established as:

$$J_1 \ddot{\varphi}_1 = -k_1 \varphi_1 + k_2 (\varphi_2 - \varphi_1) + M \sin \omega t$$

$$J_2 \ddot{\varphi}_2 = -k_2 (\varphi_2 - \varphi_1)$$

make $$b = \frac{k_1 + k_2}{J_1}, \quad c = \frac{k_2}{J_1}, \quad d = \frac{k_2}{J_2}, \quad m = \frac{M}{J_1}$$

which can be simplified to $$\ddot{\varphi}_1 + b\varphi_1 - c\varphi_2 = m \sin \omega t$$

$$\ddot{\varphi}_2 - d\varphi_1 + d\varphi_2 = 0$$

According to the theory of differential equations, a set of special solutions of the aforementioned equations can be set as $$\varphi_1 = A \sin \omega t, \quad \varphi_2 = B \sin \omega t$$

where A and B are the angular displacement amplitudes of the first movable member 12 and the executing member 20, and are constants to be determined.

It can be solved that, $$A = \frac{m(d - \omega^2)}{(b - \omega^2)(d - \omega^2) - cd}$$

$$B = \frac{md}{(b - \omega^2)(d - \omega^2) - cd}$$

the frequency equation of the system is:

$$(b - \omega^2)(d - \omega^2) - cd = 0$$

the natural frequencies $\omega_1$ and $\omega_2$ of the system can be obtained. That is, when the current frequency is $\omega = \omega_1$ or $\omega = \omega_2$, the amplitudes A and B become infinite, and the system resonates and reciprocally rotates.

where $$\omega_1 = \sqrt{\frac{(b + d) - \sqrt{(b - d)^2 + 4cd}}{2}} < \sqrt{d}$$

$$\omega_2 = \sqrt{\frac{(b + d) - \sqrt{(b - d)^2 + 4cd}}{2}} > \sqrt{d}$$

from the aforementioned formula, $$\frac{\ddot{\varphi}_1}{\ddot{\varphi}_2} = \frac{\dot{\varphi}_1}{\dot{\varphi}_2} = \frac{\varphi_1}{\varphi_2} = \frac{A}{B} = \frac{d - \omega^2}{d} < 1$$

that is, the ratio of the amplitude of the first movable member 12 to the amplitude of the executing member 20 is related to a current frequency of the electromagnet 133.

When $$0 < \omega < \sqrt{\frac{k_2}{J_2}},$$

the first movable member 12 and the executing member 20 reciprocally rotate in the same phase, and the amplitude of the executing member 20 is greater than that of the first movable member 12. This characteristic can be used to enable the motor to obtain an amplified swing output. Further, in order to make the reduction effect of the swing or vibration more obviously, the following relational expression should be satisfied:

$$0.8 < \frac{\omega}{\omega_1} < 1.2$$

When $$\omega = \sqrt{\frac{k_2}{J_2}},$$

the rotational amplitude A of the first movable member 12 is 0, that is, the first movable member 12 only reciprocally move. The influence of torque on the vibration of the machine base 11 or the housing 30 can be reduced by this characteristic.

When $$\omega > \sqrt{\frac{k_2}{J_2}},$$

the first movable member 12 and the executing member 20 rotate in opposite phases, the first movable member 12 and the executing member 20 cancel most of a rotational inertial force with each other. The influence of vibration force and torque on the vibration of the machine base 11 or the housing 30 can be reduced by this characteristic. Further, in order to control the frequency within the resonant output range of the motor, the following relational expression should be satisfied:

$$\frac{\omega}{\omega_2} < 1.2.$$

According to the aforementioned principle, in the case where the structural parameters of the swing motor 10 are determined, the current frequency can be changed to enable the executing member 20 to obtain different output effects. In the case where the current frequency is constant, the rigidity of the torsion elastic member 16 and the inertia moment of the executing member 20 can be changed to reduce the transmission of vibration force to the machine base 11, such that the product can obtain a comfortable experience. In the case where the motor is unchanged, different product functions can also be obtained by connecting the executing member 20 of different inertia moment and the current frequency control method. For example, providing a heavier brush head will cause the motor's inherent frequency of linear reciprocating vibration to deviate far from the current frequency, and close to the inherent frequency of reciprocal rotation, the linear motion is weak, and the swinging motion is strong, which is suitable for washing tartar and dental calculus.

The current of the electromagnet 133 is alternating current supplied by the drive circuit. When the reciprocating linear motion is the main output, the current frequency is approximately equal to the linear reciprocating resonance frequency of the vibration system formed by the first movable member 12 and the first elastic support member 14.

In order to enable the reciprocating motion of the swing motor obtain sufficient frequency, while not making the drive circuit and mechanical structure parts too large, the drive current frequency of the motor and the natural frequency of the executing member $$\frac{1}{2\pi}\sqrt{\frac{k_2}{J_2}}$$

are controlled between 50 HZ and 500 HZ.

In addition, a rotational rigidity coefficient of the torsion elastic member 16 (in Nm per radian) is less than a rotational rigidity coefficient of the first elastic support member 14 corresponding to the first movable member 12 connected to the torsion elastic member 16. In this way, the rotation angle of the movable member with respect to the torsion elastic member 16 and the executing member 20 is smaller, that is, when the amplitude required by the executing member 20 is constant, the amplitude of the movable member is relatively small, and the vibration transmitted to the machine base 11 is also reduced.

Figure 3:
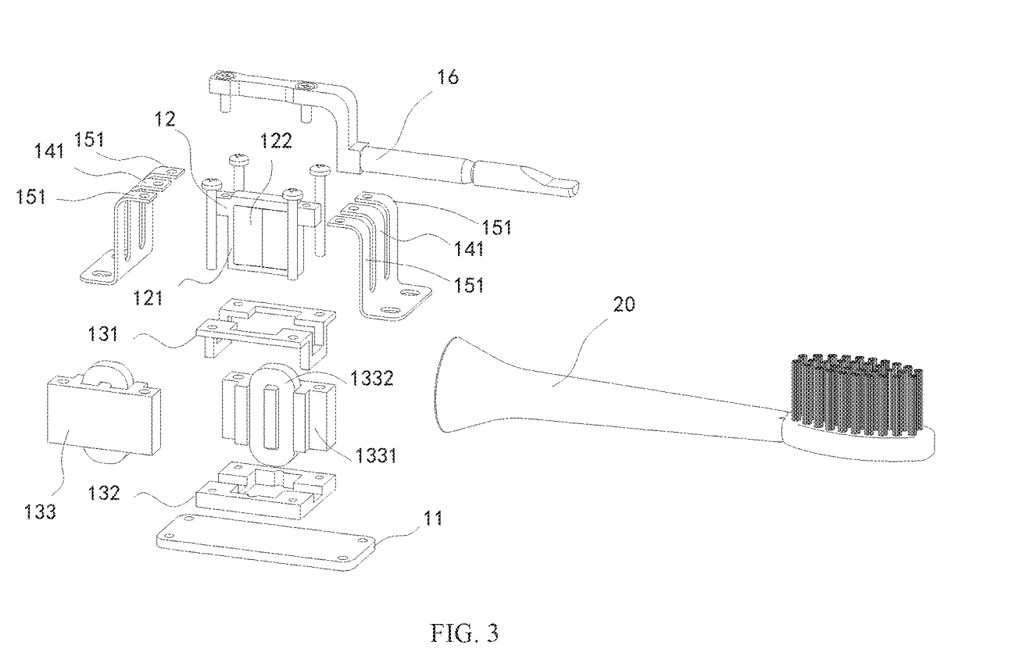
FIG. 3 is an exploded view of the structure shown in FIG. 2.

The specific structure of the swing motor described in this embodiment is described below:

Specifically, in this embodiment, referring to FIG. 3, the first movable member 12 includes a permanent magnet 122 (which may be more than one). The second provable member 13 includes an electromagnet 133 (may be more than one). The electromagnet 133 includes a coil winding 1332 and a core 1331. The core 1331 is an E-shaped silicon steel sheet laminated structure, and the coil winding 1332 is an enameled copper coil. Further, in this embodiment, the first movable member 12 includes two permanent magnets 122 arranged in parallel, and the magnetic fields of the two permanent magnets 122 are opposite. The direction of the magnetic field of one of the permanent magnets 122 is directly facing the electromagnet 133, and the direction of the magnetic field of another permanent magnet 122 is opposite thereof. The second movable member 13 includes two electromagnets 133, and the two electromagnets 133 are symmetrically arranged on both sides of the first movable member 12. The currents in the windings 1332 coil of the two electromagnets 133 are in the same direction. This arrangement makes the two parallel permanent magnets 122 located in the middle of the two electromagnets 133 spaced apart side-by-side, and the electromagnetic thrust (Lorentz force) thereof is located on a structural symmetry plane of the swing motor 10, which can reduce the impact of the vibration force and torque in other additional directions to the motor. The additional direction refers to a direction that is inconsistent with the expected moving direction of the executing member 20. In addition, the two electromagnets 133 are arranged symmetrically apart, such that the attractive force of the middle permanent magnet 122 to the core body 1331 of the electromagnets 133 on both sides can be largely canceled, reducing the load on the first support elastic member and the second support elastic member, which is conducive to structural stability. It should be noted that, in other embodiments, the positions of the electromagnet 133 and the permanent magnet 122 may also be swapped, that is, the first movable member 12 includes the electromagnet 133, and the second movable member 13 includes permanent magnets 122, and magnetic field directions of the two sets of permanent magnets 122 are the same, and the two sets of permanent magnets 122 are symmetrically arranged on both sides of the electromagnet 133.

Figure 5:
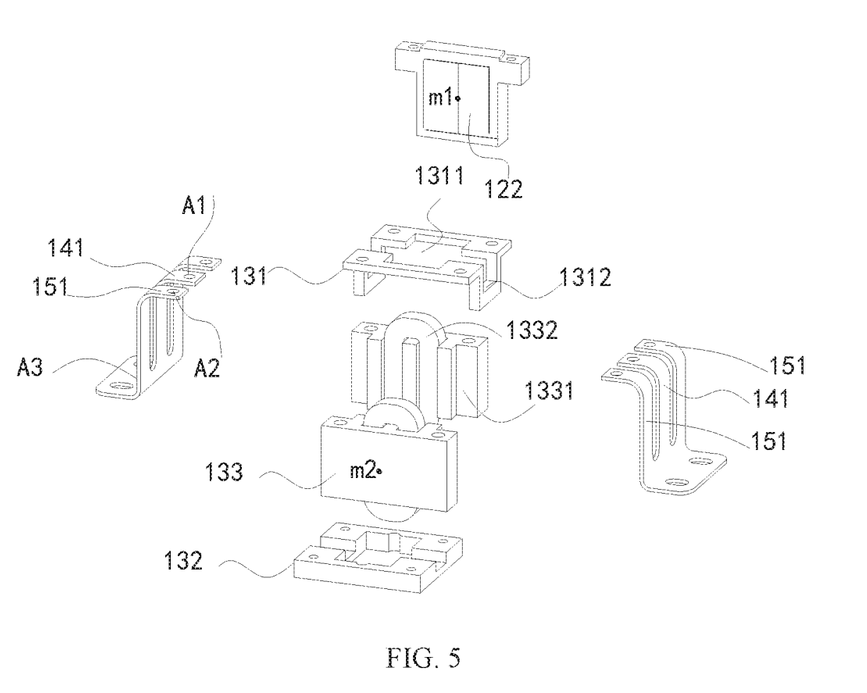
FIG. 5 is an exploded view of the first movable member, the second movable member, and the elastic support member shown in FIGS. 1 to 4.
Figure 6:
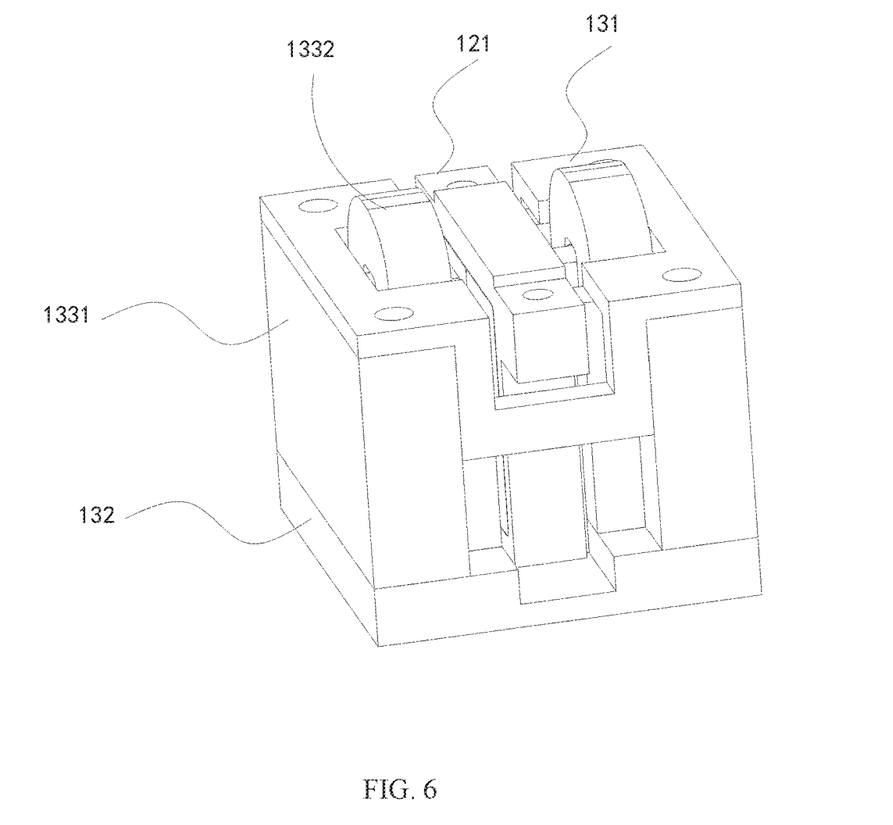
FIG. 6 is a schematic assembly view of the first movable member and the second movable member shown FIGS. 1 to 4.

Further, in this embodiment, as shown in FIGS. 3, 5 and 6, the first movable member 12 further includes a fixing frame 121, and two permanent magnets 122 are embedded in the fixing frame 121 in parallel. The second movable member 13 further includes an upper pressing plate 131 and a lower pressing plate 132. The two electromagnets 133 are arranged side-by-side between the upper pressing plate 131 and the lower pressing plate 132. The upper pressing plate 131, the lower pressing plate 132 and the core 1331 of the electromagnet 133 are connected by screws. The upper pressing plate 131 is provided with a sliding groove 1312. The upper pressing plate 131 is further provided with an opening 1311 in communication with the sliding groove 1312. The first movable member 12 extends through the opening 1311 and enter a position between the two electromagnets 133 and is relatively movably mounted in the sliding groove 1312, that is, the first movable member 12 can move linearly and reciprocally in the opening 1311, and can also swing reciprocally in the opening 1311. The aforementioned design allows the two parallel permanent magnets 122 to be held in the middle of two electromagnets 133 spaced apart side-by-side, and both of the first movable member 12 and the second movable member 13 can relatively move or swing. The structure design of the present disclosure is reasonable, the structure is simple, the number of components is small, and the production cost is low.

In this embodiment, the acting point of the first elastic support member 14 on the first movable member 12 is deviated from the mass center (m1) of the structure formed by both of the first movable member 12 and the executing member 20. The electromagnetic thrust or axial inertia force subjected by the first movable member 12 and the acting force of the first elastic support member 14 can form the aforementioned first rotational torque, such that the first movable member 12 and the executing member 20 swing with respect to the machine base 11. Similarly, the acting point of the second elastic support member 15 on the second movable member 13 is deviated from the mass center (m2) of the second movable member 13, the electromagnetic thrust or axial inertia force subjected by the second movable member 13 and the acting force of the second elastic supporting member 15 may form the aforementioned second rotating torque, such that the second movable member 13 swings with respect to the machine base 11.

Specifically, referring to FIG. 3 and FIG. 5, the first elastic support member 14 includes two spaced apart first elastic pieces 141. The two first elastic pieces 141 are provided on both sides of the first movable member 12, and one ends of the two first elastic pieces 141 are fixed to the machine base 11 by screws, and the other ends thereof are connected to the top of the fixing frame 121 of the first movable member 12 by screws. The first elastic pieces 141 are all Z-shaped sheet structures. The two spaced apart first elastic pieces 141, the first movable member 12 and the machine base 11 form a quadrilateral structure, and the plane of the acting point (A1) of the two first elastic pieces 141 deviated from plane of the mass center (m1) of structure formed by the first movable member 12 and the executing member 20 in the vertical direction perpendicular to the machine base 11. During the movement of the motor, the electromagnetic thrust or axial inertial force subjected by the first movable member 12 and the executing member 20, and the acting force of the first elastic piece 141 may form the first rotating torque, such that the first movable member 12 and the executing member 20 can swing with respect to the machine base 11.

The second elastic support member 15 includes four second elastic pieces 151, two of the second elastic pieces 151 and other two of the second elastic pieces 151 are respectively disposed on both sides of the second movable member 13. Each electromagnet 133 corresponds to two second elastic pieces 151. One ends of the second elastic pieces 151 are fixed to the machine base 11 by screws, and the other ends thereof are connected to the upper pressing plate 131 by screws. The second elastic pieces 151 are all Z-shaped sheet structures. For every electromagnet 133, the two spaced apart first elastic pieces 151, electromagnet 133 and the machine base 11 form a quadrilateral structure, and the plane of the acting points (A2) of the two first elastic pieces 151 deviated from plane of the mass center (m2) of the second movable member 13 in the vertical direction perpendicular to the machine base 11. During the movement of the motor, the electromagnetic thrust or axial inertial force subjected by the second movable member 12 and the acting force of the second elastic piece 151 may form the second rotating torque, such that the second movable member 12 can swing with respect to the machine base 11.

It should be noted that, in other embodiments, the two spaced apart first elastic pieces 141, the first movable member 12, and the machine base 11 may also form an isosceles trapezoidal structure. The acting direction of the electromagnetic thrust subjected by the first movable member 12 is the same as the main deforming direction of the first elastic piece 141, and the first movable member 12 may also swing with respect to the machine base 11. Similarly, the two spaced apart second elastic pieces 151, the electromagnet 133 and the machine base 11 form an isosceles trapezoidal structure, the acting direction of the electromagnetic thrust subjected by the electromagnet 133 is the same as the main deforming direction of the second elastic piece 151, and it can also enable the electromagnet 133 to swing with respect to the machine base 11.

Further, in this embodiment, bottom ends of the first elastic piece 141 and the second elastic piece 151 on the same side are integrally connected as a whole piece structure (a whole elastic piece structure) fixed on the machine base 11, and then fixed on the machine base 11, such that the structure of the elastic support member can be simplified, so as to facilitate manufacturing and mounting, and reduce the cost. In addition, the acting forces subjected by the first elastic support member 14 and the second elastic support member 15 are in opposite directions, such that the internal canceling effect s performed first in the whole piece structure, and a vibration force transmitted to the machine base 11 will be further reduced.

Optionally, the two first elastic pieces 141 are symmetrically distributed on both sides of the first movable member 12, and the four second elastic pieces 151 are symmetrically distributed on both sides of the second movable member 13, such that the first movable member 12 and the second movable member 13 are subjected to balanced force. All acting points of the first elastic pieces 141 on the first movable member 12 and all acting points of the second elastic pieces 151 on the second movable member 13 are located in the same plane, such that the elastic acting force is distributed in the same plane, which can cancel the transmission of a part of the vibration force to the housing. Specifically, the acting point of the first elastic piece 141 on the first movable member 12 and the acting point of the second elastic piece 151 on the second movable member 13 may be approximately in the two basic planes parallel to the machine base 11, the two basic planes roughly coincide (generally the distance is less than 0.5 mm).

In addition, the mass center of a structure formed by both of the first movable member 12 and the executing member 20 and the mass center of the second movable member 13 are also located in two basic planes parallel to the machine base 11, and these two basic planes roughly coincide (generally the distance is less than 0.5 mm), such that the inertial force of the structure formed by the first movable member 12 and the executing member 20, and the second movable member 13 are distributed in the same plane, which can cancel the transmission of a part of the vibration force to the housing 30.

In addition, the acting point of the combined force of the electromagnetic thrust subjected by the permanent magnet 122 in the first movable member 12 and the mass center of the structure formed by the first movable member 12 and the executing member 20 are located in two basic planes parallel to the machine base 11, and the two basic planes roughly coincide (generally the distance is less than 0.5 mm); in the same way, the acting point of the combined force of the electromagnetic thrusts subjected by the electromagnet 133 in the second movable member 13 and the mass center of the second movable member 13 are located in two basic planes parallel to the machine base 11, and the two basic planes roughly coincide (generally the distance is less than 0.5 mm), such that the inertial forces of the first movable member 12 and the second movable member 13 are distributed in the same plane, which can cancel the transmission of a part of the vibration force to the housing 30.

It should be noted that, in the embodiments shown in FIGS. 2 to 6, one of the movable members includes a permanent magnet 122, and the other movable member includes an electromagnet 133. However, the design principles of the present disclosure are still applicable to the following embodiments: the electromagnetic device of the swing motor 10 further includes a fixing member that is stationary with respect to the machine base 11, the fixing member includes an electromagnet, both of the first movable member 12 and the second movable member 13 include a permanent magnet, and the torsion elastic member 16 is connected to the first movable member 12 or the second movable member 13. Alternatively, the electromagnetic device of the swing motor 10 further includes a fixing member that is stationary with respect to the machine base 11, the fixing member includes a permanent magnet, both of the first movable member 12 and the second movable member 13 include an electromagnet, the torsion elastic member 16 is connected to the first movable member 12 or the second movable member 13.

In summary, in the present disclosure, the motor obtains a swing driving by the structural arrangement of the movable member, the elastic support member, the torsion elastic member, and the executing member. In the case of an electric toothbrush, the toothbrush head has a motion output of linear reciprocating and swinging reciprocating, which is more effective to clean the teeth. At the same time, the torsion elastic member 16 connects the first movable member 12 and the executing member 20 to form a vibration system, such that the swing motor 10 can obtain different output effects of the executing member 20 by changing the frequency, such as a larger swing amplitude or a lower vibration of the machine base 11. By the elastic force provided by the torsion elastic member 16, under the drive of the alternating current in a specific frequency, the executing member 20 can provide a balancing torque to the movable member without adding a weight or only a weight with a smaller volume is required, which can further miniaturize the motor.

The technical features of the embodiments described above may be arbitrarily combined. For the sake of brevity of description, not all possible combinations of the technical features in the aforementioned embodiments are described. However, as long as there is no contradiction between the combinations of these technical features, all should be considered as the scope of this specification.

The aforementioned examples only express several implementation of the present disclosure, and the descriptions thereof are more specific and detailed, but they cannot be understood as a limitation on the scope of the present disclosure. It should be noted that, for those who skilled in the art, a plurality of modifications and improvements can be made without departing from the concept of the present disclosure, which all belong to the protection scope of the present disclosure.

What is claimed is:

1. A swing motor, comprising:
   a machine base;
   at least two movable members, the movable members being movable parts of an electromagnetic device, the at least two movable members comprising a first movable member and a second movable member that are spaced apart, and the first movable member and the second movable member being subjected to opposite electromagnetic thrusts, and the first movable member and the second movable member reciprocating in opposite phases, wherein both of the first movable member and the second movable member simultaneously obtain a compound motion of linear reciprocating movement and reciprocating swinging around a centroid;
   elastic support members being in one-to-one correspondence with the movable member, the elastic support members comprising a first elastic support member and a second elastic support member, the first movable member being mounted to the machine base by the first elastic support member, the second movable member being mounted to the machine base by the second elastic support member, the first movable member being subjected to a first rotating torque generated by combining an elastic force of the first elastic support member and the electromagnetic thrust, and the second movable member being subjected to a second rotating torque generated by combining an elastic force of the second elastic support member and the electromagnetic thrust;
   wherein the swing motor further comprises a torsion elastic member, one end of the torsion elastic member is connected to the first movable member or the second movable member, and the other end thereof is connected to an executing member.

2. The swing motor according to claim 1, wherein a rotational deforming direction of the torsion elastic member and a rotational deforming direction of the elastic support member corresponding to the movable member connected to the torsion elastic member are the same or opposite; a linear moving direction of the torsion elastic member is the same as a linear deforming direction of the elastic support member corresponding to the movable member connected to the torsion elastic member.

3. The swing motor according to claim 1, wherein a rotational rigidity coefficient of the torsion elastic member is less than a rotational rigidity coefficient of the elastic support member corresponding to the movable member connected to the torsion elastic member.

4. An electric device, comprising the executing member and the swing motor according to claim 1.

5. The swing motor according to claim 1, further comprising a fixed member, wherein the fixed member comprises an electromagnet, and both the first movable member and the second movable member comprise a permanent magnet; or the swing motor further comprising a fixed member, the fixed member comprises a permanent magnet, both the first movable member and the second movable member comprise an electromagnet.

6. The swing motor according to claim 1, wherein the first movable member comprises an electromagnet, the second movable member comprises two sets of the permanent magnets, the magnetic field directions of the two sets of the permanent magnets are the same, and the two sets of the permanent magnets are symmetrically arranged on both sides of the electromagnet.

7. The swing motor according to claim 1, wherein by an elastic force provided by the torsion elastic member, the executing member is configured to provide a balancing torque to the first movable member to cancel an inertial torque caused by an inconsistency of gravity centers of the first movable member and the second movable member.

8. The swing motor according to claim 1, wherein the first elastic support member comprises at least two first elastic pieces, the at least two first elastic pieces are respectively disposed on both sides of the first movable member, and one ends of the first elastic pieces are fixed on the machine base, the other ends thereof are connected to the first movable member, the second elastic support member comprises at least two second elastic pieces, the at least two second elastic pieces are respectively disposed on both sides of the second movable member, and one ends of the second elastic pieces are fixed on the machine base, the other ends thereof are connected to the second movable members, bottom ends of the first elastic pieces and the second elastic pieces on the same side are integrally connected as a whole piece structure fixed on the machine base.

9. The swing motor according to claim 8, wherein all acting points of the first elastic pieces on the first movable member and all acting points of the second elastic pieces on the second movable member are located in the same plane.

10. The swing motor according to claim 1, wherein the first movable member comprises a permanent magnet, the second movable member comprises an electromagnet.

11. The swing motor according to claim 10, wherein the first movable member comprises a permanent magnet, the second movable member comprises two electromagnets, current magnitudes and directions of the two electromagnets are the same, and the two electromagnets are symmetrically arranged on both sides of the permanent magnet.

12. A swing motor, comprising:
a machine base;
at least two movable members, the movable members being movable parts of an electromagnetic device, the at least two movable members comprising a first movable member and a second movable member that are spaced apart, and the first movable member and the second movable member being subjected to opposite electromagnetic thrusts, and the first movable member and the second movable member reciprocating in opposite phases;
elastic support members being in one-to-one correspondence with the movable member, the elastic support members comprising a first elastic support member and a second elastic support member, the first movable member being mounted to the machine base by the first elastic support member, the second movable member being mounted to the machine base by the second elastic support member, the first movable member being subjected to a first rotating torque generated by combining an elastic force of the first elastic support member and the electromagnetic thrust, and the second movable member being subjected to a second rotating torque generated by combining an elastic force of the second elastic support member and the electromagnetic thrust;
wherein the swing motor further comprises a torsion elastic member, one end of the torsion elastic member is connected to the first movable member or the second movable member, and the other end thereof is connected to an executing member,
wherein a current frequency ω of the electromagnetic device, a rotational rigidity coefficient of the torsion elastic member $k_2$, and a rotational inertia of the executing member $J_2$ satisfy the following relationship:
when the executing member needs to obtain an amplified swing output, or when a swing amplitude is required to be constant, and a vibration force transmitted to the machine base is required to be reduced $$0 < \omega < \sqrt{\frac{k_2}{J_2}};$$

when a rotation amplitude of the movable member connected to the executing member is required to be controlled to be zero, $$\omega = \sqrt{\frac{k_2}{J_2}};$$

when rotations of the executing member and the movable member connected to the executing member are required to be controlled as opposite phases, $$\omega > \sqrt{\frac{k_2}{J_2}}.$$

13. A swing motor, comprising:
a machine base;
at least two movable members, the movable members being movable parts of an electromagnetic device, the at least two movable members comprising a first movable member and a second movable member that are spaced apart, and the first movable member and the second movable member being subjected to opposite electromagnetic thrusts, and the first movable member and the second movable member reciprocating in opposite phases;
elastic support members being in one-to-one correspondence with the movable member, the elastic support members comprising a first elastic support member and a second elastic support member, the first movable member being mounted to the machine base by the first elastic support member, the second movable member being mounted to the machine base by the second elastic support member, the first movable member being subjected to a first rotating torque generated by combining an elastic force of the first elastic support member and the electromagnetic thrust, and the second movable member being subjected to a second rotating torque generated by combining an elastic force of the second elastic support member and the electromagnetic thrust;
wherein the swing motor further comprises a torsion elastic member, one end of the torsion elastic member is connected to the first movable member or the second movable member, and the other end thereof is connected to an executing member,
wherein the first movable member comprises a permanent magnet, the second movable member comprises an electromagnet,
wherein the first movable member comprises a permanent magnet, the second movable member comprises two electromagnets, current magnitudes and directions of the two electromagnets are the same, and the two electromagnets are symmetrically arranged on both sides of the permanent magnet,
wherein the first movable member further comprises a fixing frame, the two permanent magnets are arranged in parallel in the fixing frame, the second movable member further comprises an upper pressing plate and a lower pressing plate, the two electromagnets are arranged side-by-side between the upper pressing plate and the lower pressing plate, the upper pressing plate is provided with a sliding groove and an opening in communication with the sliding groove, the first movable member extends through the opening and enters a position between the two electromagnets and is relatively movably mounted in the sliding groove.

* * * * *